United States Patent
Ritter

(10) Patent No.: US 10,489,378 B2
(45) Date of Patent: Nov. 26, 2019

(54) DETECTION AND RESOLUTION OF CONFLICTS IN DATA SYNCHRONIZATION

(71) Applicant: SAP SE, Walldorf (DE)

(72) Inventor: Gerd Martin Ritter, Heidelberg (DE)

(73) Assignee: SAP SE, Walldorf (DE)

( * ) Notice: Subject to any disclaimer, the term of this patent is extended or adjusted under 35 U.S.C. 154(b) by 413 days.

(21) Appl. No.: 14/962,435

(22) Filed: Dec. 8, 2015

(65) Prior Publication Data

US 2017/0161313 A1  Jun. 8, 2017

(51) Int. Cl.
*G06F 16/23* (2019.01)
*G06F 16/27* (2019.01)

(52) U.S. Cl.
CPC .......... *G06F 16/2365* (2019.01); *G06F 16/27* (2019.01)

(58) Field of Classification Search
CPC ......... G06F 17/30575; G06F 17/30371; G06F 17/30011; G06F 16/2365; G06F 16/27
USPC .................................................. 707/634, 690
See application file for complete search history.

(56) References Cited

U.S. PATENT DOCUMENTS

| | | | | |
|---|---|---|---|---|
| 5,787,262 A * | 7/1998 | Shakib | .................. | G06F 9/52 707/999.008 |
| 6,021,118 A * | 2/2000 | Houck | .............. | G06F 15/17381 370/254 |
| 6,473,503 B1 * | 10/2002 | Karau | ............... | H04M 3/42144 379/221.13 |
| 9,201,850 B1 * | 12/2015 | Buddhiraja | ............. | G06F 17/21 |
| 2003/0172168 A1 * | 9/2003 | Mak | ...................... | G06F 16/258 709/230 |
| 2006/0242204 A1 * | 10/2006 | Karas | .................... | G06F 16/273 707/E17.032 |
| 2009/0228819 A1 * | 9/2009 | McDermott | .......... | G06F 3/0486 715/769 |
| 2010/0023560 A1 * | 1/2010 | Erb | ..................... | G06F 16/2343 707/E17.01 |
| 2010/0169407 A1 * | 7/2010 | Hsueh | ....................... | G06F 9/52 709/203 |
| 2010/0325531 A1 * | 12/2010 | Petronijevic | ............ | G06F 9/468 715/234 |
| 2012/0204270 A1 * | 8/2012 | Paulino | ................. | G06F 21/105 726/28 |
| 2013/0262373 A1 * | 10/2013 | Rampson | ............... | G06Q 10/10 707/608 |
| 2015/0113015 A1 * | 4/2015 | Zhang | .................... | H04L 67/42 707/758 |
| 2015/0142776 A1 * | 5/2015 | Solheim | .............. | G06F 16/9535 707/722 |
| 2016/0020949 A1 * | 1/2016 | Mares | .................. | G06Q 10/101 709/221 |
| 2016/0154539 A1 * | 6/2016 | Buddhiraja | ......... | G06F 9/45558 715/738 |

(Continued)

*Primary Examiner* — Phong H Nguyen
(74) *Attorney, Agent, or Firm* — Sterne, Kessler, Goldstein & Fox P.L.L.C.

(57) ABSTRACT

Disclosed herein are system, method, and computer program product embodiments for the detection and resolution of conflicts in data synchronization. An embodiment operates by receiving an upload from a user device of one or more changes to a local copy of a master document. A conflict is identified between the one or more uploaded changes and one or more previous changes to the master document. A super user is notified of the conflict. A resolution of the conflict is received. The resolution to resolve the conflict is applied.

18 Claims, 4 Drawing Sheets

(56) References Cited

U.S. PATENT DOCUMENTS

2017/0147545 A1* 5/2017 Amoli ................ G06F 17/24
2017/0149885 A1* 5/2017 Kaplan ............... G06F 16/178

* cited by examiner

DETECTION AND RESOLUTION OF CONFLICTS IN DATA SYNCHRONIZATION

BACKGROUND

Data synchronization is an important function of enterprise systems in which documents are shared between multiple users who may independently access or modify the documents, particularly when the documents are available for offline access. While this access by multiple users may improve productivity, it also produces synchronization problems when multiple users are trying to modify the same data or documents. Such synchronization problems could lead to data inconsistency and data integrity issues.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for the detection and resolution of conflicts in data synchronization.

Figure 1:
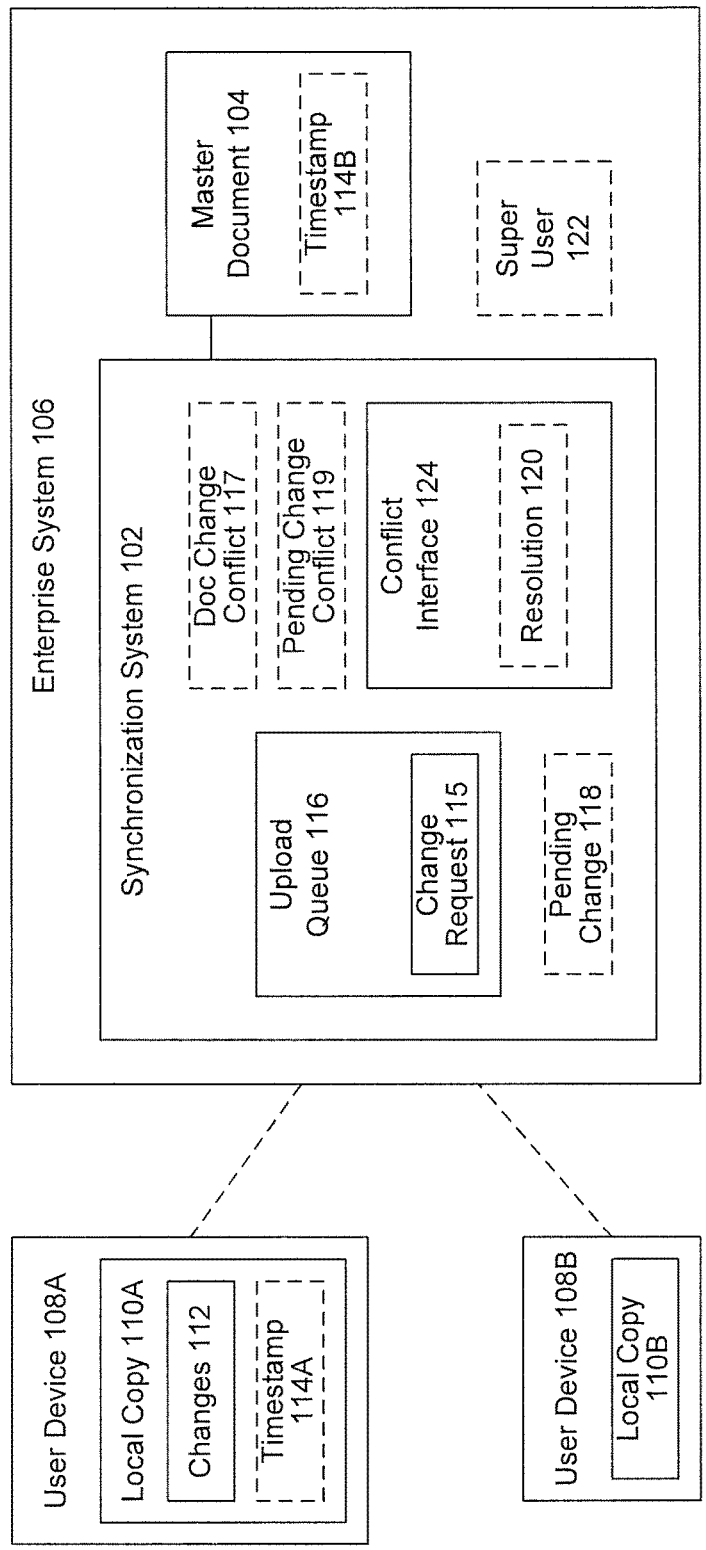
FIG. 1 is a block diagram of a system that detects and resolves conflicts in data synchronization, according to an embodiment.

FIG. 1 is a block diagram of a system 100 for the detection and resolution of conflicts in data synchronization, according to an example embodiment. A synchronization system 102 may manage data synchronization for one or more master documents 104 of an enterprise system 106 that are being modified or accessed by multiple users or user devices 108. Synchronization system 102 detects and resolves conflicts that may arise due to this simultaneous data access across one or more user devices 108.

Enterprise system 106 may include any computing system or network that allows multiple users or user devices 108 to access and/or update data, such as master doc 104. As used herein, the terms user and user device 108 are used interchangeably. Example enterprise systems 106 may include a cloud data system, or a business communication system. For example, a business may maintain or have an enterprise system 106 that enables communication, including document sharing across different users 108. Enterprise system 106 may include one or more document stores that include various documents or data pertinent or related to a business, or other data objects (collectively referred to herein as master documents 104). Example master documents 104 include word processing documents, spreadsheets, databases, account data, business unit data, metadata related to other documents or data or any other data or documents. These master documents 104 (i.e., master docs 104) may be used, modified, or otherwise accessed by multiple users 108 within and/or outside the business organization. Enterprise system 106 may provide users 108 the ability to access/modify master docs 104 online and/or offline.

In online data access, a user 108A may directly make changes, updates, or modifications to master doc 104 while being communicatively coupled to enterprise system 106. In an embodiment, while user 108A is updating master doc 104 through online access, master doc 104 may be locked so as to prevent other users 108B from simultaneously changing the data of master doc 104 in an online mode. However, user 108B may update a local or offline copy 110B of the master doc 104 even while master doc 104 is being accessed by user 108A, or is being synchronized with a local copy 110A.

In offline data access, multiple users 108 may each make changes, updates, or modifications to a local copy 110 of master doc 104. Local copy 110 may include a snapshot, a copy, or a partial copy of the data of master doc 104 that is locally accessible at one or more user devices 108. Offline data access and modification, as provided by enterprise system 106, may enable users who are working remotely and/or do not have constant access/connectivity to enterprise system 106 to nonetheless access and modify master docs 104 maintained on enterprise system 106. In an embodiment, offline access to the data from master docs 104 may provide faster access or better performance, rather than requiring constant connectivity or communication between enterprise system 106 and a user device 108. This allows multiple users to simultaneously access and/or modify the data of master doc 104.

The offline changes 112 made by different users 108 may periodically be communicated to or otherwise synchronized with enterprise system 106 through synchronization system 102. Synchronization system 102 may receive and process these change requests 115, and update master doc 104 (and/or local copies 110) accordingly. The synchronization process may include both the upload of changes 112 received from a user device 108, as well as the download of changes from master doc 104 to a local copy 110 stored on a user device 108.

In an embodiment, different user devices 108A and 108B may each have their own local copy 110A and 110B, respectively, of one or more master docs 104 stored on enterprise system 106. Users 108 may work offline with their local copy 110, modifying, adding, and removing data. User device 108 may periodically upload changes 112 made to local copy 110 to synchronization system 102. Synchronization system 102 may then update master doc 104 accordingly.

A local copy 110 may have its own timestamp(s) 114A, and master doc 104 may have its own timestamp(s) 114B. Timestamps 114 may indicate when a document was created, accessed, or modified. In an embodiment, timestamps 114 may also include additional information indicating what modifications (data additions, deletions, or other changes) were made to the document, which data is affected (e.g., if data in column 1 was changed, data in column 2 may depend on the values of column 1 and thus may be affected by the changed data of column 1), and which user(s) made the respective modifications. In another embodiment, this and other additional information may be tracked by synchronization system 102. Timestamp 114A may include timestamp data for local copy 110, and timestamp 114B may include timestamp data for master document 104.

Synchronization system 102 may receive a change request 115 that includes changes 112 made to local copy 110 at a user device 108 for synchronization with master doc 104.

Synchronization system 102 may store the change request 115 in an upload queue 116. Upload queue 116 may be a queue of change requests 115 received from different users and/or user devices 108 of enterprise system 106. In an embodiment, different master docs 104 or document types (e.g., word processing, spreadsheet, pertaining to one or more programs or applications) may have their own upload queues 116 for change requests 115 pertaining to the respective document(s) 104, or a single upload queue 116 may receive change requests across different master documents 104 or document types.

Upload queue 116 may prioritize received change requests 115 based on any different number or combination of priority schemes. Example priority schemes include last-in-first-out (LIFO) and first-in-first-out (FIFO) basis. Or, for example, the priority scheme may include prioritizing change requests 115 based on a priority of a user 108 associated with the request 115, a priority of the data and/or document 104 being updated, or any other priority factor.

Synchronization system 102 may then retrieve change request 115 from upload queue 116 and process change request 115. Change request 115 may include changes 112 and other information relevant to synchronizing the data of local copy 110A and master doc 104. This additional information may include, for example, a document identifier, timestamp 114A, when change request 115 was received or queued, a document locator, a username or device name associated with changes 112, and/or other information.

The document identifier may be a unique document name, number, or other identifier used to identify master doc 104 on enterprise system 106. In an embodiment, different master docs 104 may each have different identifiers that uniquely identify the master doc 104 on enterprise system 106. When local copy 110 is generated and/or synchronized, a copy of the document identifier may be provided to user device 108 that indicates a document, version, or timestamp indicator 114B associated with master doc 104 that can be used to determine with which version of master doc 104 local copy 110 has been synchronized.

The document locator may include an indication of where master doc 114 is stored or located on enterprise system 106. The document locator may include, for example, a drive, folder, memory location, address or path, table, document type, or other storage identifier that may indicate where master doc 104 is stored. The document identifier may be any information that may help narrow or otherwise speed up a search for master doc 104 on enterprise system 106 when being synchronized with one or more user devices 108 and/or changes 112. This document locator information may save time and/or resources when enterprise system 106 manages a large volume of documents 104 being synchronized across a large number of user devices 108. For example, rather than having to search through all the stored master docs 104 for a provided indicator, the document locator may specify a particular drive, folder, or table to search.

As noted above, each local copy 110 of a master doc 104 may have its own timestamp 114A. In an embodiment, timestamp 114A may indicate when local copy 110A was either copied/stored on user device 108A and/or last synchronized with master doc 104. For example, local copy 110A may have been stored on user device 108A on Sep. 1, 2015. On Sep. 28, 2015 user device 108A may synchronize with master doc 104. If there were changes made to master doc 104 since September $1^{St}$, synchronization system 102 may provide those changes to user device 108A or provide a new copy of master doc 104 or local copy 110A with any intermediate changes that may have been made to master doc 104 to be used as local copy 110A on user device 108A. Timestamp 114A may then indicate the September $28^{th}$ date. If however there were no new changes to either local copy 110A or master doc 104 on September $28^{th}$ to be synchronized, timestamp 114AB may indicate that local copy was current as of Sep. 1, 2015. Timestamp 114A may be provided with change request 115.

When synchronization system 102 retrieves change request 115 from upload queue 116, synchronization system 102 may attempt to synchronize the data of master doc 104 with changes 112. However, during the synchronization process synchronization system 102 may detect or identify one or more conflicts that need to be resolved before synchronization can complete.

One example conflict that may be detected by synchronization system 102 is a document change conflict (doc change conflict 117). A document change conflict 117 may occur or be detected by synchronization system 102 if master doc 104 was modified since timestamp 114A. In an embodiment, to detect a doc change conflict 117, synchronization system 102 may compare timestamp 114A to timestamp 114B. If timestamp 114B is the same as timestamp 114A, there is no doc change conflict 117. However if synchronization system 102 determines timestamp 114B is later than or otherwise after timestamp 114A, then a doc change conflict 117 or a potential doc change conflict may be identified.

In an embodiment, synchronization system 102 may perform a second level of processing to determine if a potential doc change conflict is an actual doc change conflict 117. The second level of processing may determine if the data associated with changes 112 is the same data that was modified or affected during one or more previous updates to master doc 104 since timestamp 114A. In an embodiment, different records or pieces of data may each have their own individual or grouped timestamps.

For example, synchronization system 102 may track which data was modified during one or more previous synchronization processes (even if performed by different users 108). Synchronization system 102 may then compare the data to be affected by changes 112 to the previously modified data of master doc 104. If there is an overlap in the previously modified data of master doc 104 and the to-be changed or affected data of changes 112, then synchronization system 102 may detect or identify a doc change conflict 117. If, however, no data overlap exists, synchronization system 102 may apply changes 112 to master doc 104 and update timestamp 114A and 114B accordingly.

In another example embodiment, synchronization system 102 may not perform a second level of processing, and whenever timestamp 114B is subsequent to timestamp 11A, a doc change conflict 117 may be identified.

Another example conflict that may be detected by synchronization system 102 is a pending change conflict 119. For example, if timestamp 114B is the same as timestamp 114A, synchronization system 102 may determine there is no doc change conflict 117 and may attempt to apply changes 112 to master doc 104. However, there may be one or more pending changes 118 on master doc 104 that may indicate a pending change conflict 119.

A pending change 118 may be a previously uploaded or requested change to data of master doc 104 (e.g., from another user device 108) that has not yet been processed. A change may not be synchronized/processed or may be delayed in being processed (e.g., implemented into master doc 104) for any number of reasons, including either business or technical reasons.

For example, there may be a temporary technical error that is preventing a previously submitted pending change 118 from being committed to master doc 104. Or, for example, there may a business logic reason why pending change 118 has not been implemented. One approach to the detection and resolution of a temporary technical or other error that may not require user intervention for resolution is described in co-pending application Ser. No. 14/962,516, entitled "Automatic Detection, Retry, and Resolutions of Errors in Data Synchronization" filed Dec. 8, 2015, which is hereby incorporated by reference in its entirety.

An example business logic reason may be that pending change 118 requires the approval of one or more business partners or associates who have not yet approved the change 118, or that the requested change 118 may have a requisite hold period before being made final or is to be implemented. Example pending changes 118 may be the receipt of a check deposit from a customer that has not yet cleared, the adding or removing of a customer account, a new client contact, or a new or modified contract. Pending change 118 may be a change provided by the same user (e.g., of user device 108A) that has submitted a change request 115 that is being processed, or may have been submitted by a different user or user device 108B.

In an embodiment, similar to what is described above with regard to a potential doc change conflict, with a potential pending, change conflict 119 synchronization system 102 may perform a second level of processing. During the second level of processing, synchronization system 102 may determine whether or not the same data is affected by both pending change 118 and changes 112 that are being processed. If the data is the same, a pending change conflict 119 may be detected or determined. If synchronization system 102 determines there is no data overlap or conflict, then no pending change conflict 119 may be detected and changes 112 may nonetheless be implemented while pending change 118 is still pending.

In an embodiment, whether or not synchronization system 102 performs the second level processing upon the detection of a potential conflict may be made on a case-by-case basis. For example, if master doc 104 is a spreadsheet with different records that are not necessarily dependent on each other, or a word processing document with different sections (that may be handled by different users 108) then second level processing may be performed. If, however, document 104 is more integrated and the data of document 104 is highly dependent on other data of document 104, no second level processing may be performed, and a potential conflict may be determined to be an actual conflict 117, 119 that requires resolution before implementing changes 112.

Upon the detection of one or more conflicts 117 and/or 119, synchronization system 102 may request or otherwise determine a resolution 120 of the conflict(s) 117, 119. Resolution 120 may be any action(s) that resolve the conflict 117, 119. Example resolutions 120 may include not implementing changes 112, cancelling pending change 118, receiving additional input or data with which to update master doc 104 and/or local copy 110, rolling back a previous change made to local copy 110 and/or master doc 104, or any combination of resolutions 120 thereof. Or, for example, changes 112 may be added to a pending change 118 queue.

Synchronization system 102 may request resolution 120 from a super user 122. Super user 122 may be any user who is identified as being able or responsible for resolving the identified conflict(s) 117, 119. Different super user(s) 122 may be designed for different conflict(s), different document (s) 104, different users and/or user devices 108, different time periods, or based on any other number of factors. In an embodiment, super user 122 may be the user who provided changes 112 via user device 108, the user who made a previous modification or a pending change 118 to master doc 104, a manager, or another conflict resolution specialist.

In an embodiment, synchronization system 102 may generate a conflict interface 124. Conflict interface 124 may notify super user 122 of the conflict. Via conflict interface 124, synchronization system 102 may provide access or a view of data affected by the conflict(s) 117, 119 and that may be necessary to resolve the one or more of the identified conflict(s) 117, 119. Synchronization system 102 may then receive resolution 120 from one or more super users 122 via conflict interface 124.

With a doc change conflict 117, conflict interface 124 may include information from master doc 104, changes 112, and/or local copy 110. For example, conflict interface 124 may indicate the data of master doc 104 as it existed at timestamp 114A, the change(s) to the data of doc 104 that were made since 114A (including when those changes were made and by whom), and the requested changes 112 retrieved from upload queue 116.

With a pending change conflict 119, conflict interface 124 may include information from master doc 104, changes 112, local copy 110, and/or pending change 118. For example, conflict interface 124 may indicate the data of master doc 104 as it existed at timestamp 114A, the pending changes 118 (including who requested the changes, when they were requested, and what event/approval may be associated with the changes that are pending), and the requested changes 112 retrieved from upload queue 116.

Super user 122 may be provided a link or access to conflict interface 124, may view the displayed data, and determine how to resolve the conflict. Resolution 120 may include a determination as to which conflicted data should be used for master doe 104. Synchronization system 102 may then apply resolution 120 to master doc 104, provide resolution 120 to user device 108A, update upload queue 116 and/or pending changes 118, and notify one or more users 108 who may be affected by resolution 120 (e.g., who were associated with updating master doc 104 or who otherwise have a local copy 108 of master doe 104).

Figure 2:
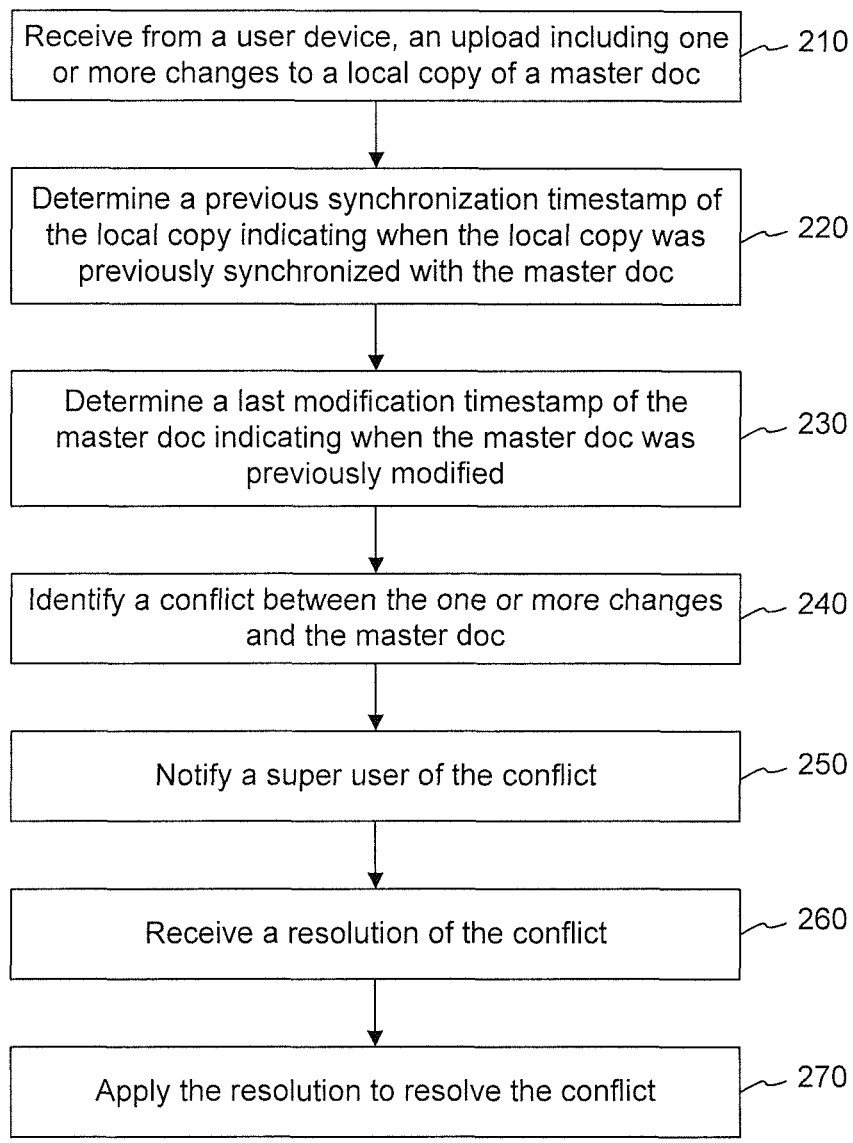
FIG. 2 is a flowchart for a method for the detection and resolution of conflicts in data synchronization, according to an embodiment.

FIG. 2 is a flowchart for a method 200 for the detection and resolution of conflicts in data synchronization, according to an embodiment. Method 200 can be performed by processing logic that can comprise hardware (e.g., circuitry, dedicated logic, programmable logic, microcode, etc.), software (e.g., instructions executing on a processing device), or a combination thereof.

In step 210, an upload is received from a user device, the upload including one or more changes to a local copy of a master document. For example, synchronization system 102 may receive change request 115 from user device 108A. Change request 115 may include changes 112 to local copy 110A of master doc 104. When user device 108A is connected to enterprise system 106, changes 112 may be uploaded to synchronization system 102 and stored in upload queue 116 until processed. In an embodiment, changes 112 may include modifications to local copy 110A made since timestamp 114A, or a complete/partial copy local copy 110A.

In step 220, a previous synchronization timestamp of the local copy indicating when the local copy was previously synchronized with the master doc is determined. For example, change request 115 may include changes 112 as well as various other data received from user device 110A. This additional information may include timestamp data 114A that indicates when local copy 110A was previous synchronized with master doc 104.

In step 230, a last modification timestamp of the master doc indicating when the master doe was previously modified is determined. For example, synchronization system 102 may determine timestamp 114B of master doc 104. Timestamp 114B may indicate when master doe 104 was last updated, which data was modified, and which user(s) updated, modified, or accessed the data.

In step 240, a conflict is identified between the one or more changes and the master doc. For example, synchronization system 102 may compare timestamp 114B and 114A to determine if a conflict or potential conflict exists between changes 112 and master doc 104. For example, timestamp 114A may indicate when local copy 110 was last synchronized with master doc 104, and timestamp 114B may indicate when mater doc 104 was previously synchronized with changes 112 (from any user 108). Then, for example, if timestamp 114B is the same as timestamp 114A, no doc change conflict 117 may exist and changes 112 may be implemented or otherwise synchronized with master doc 104. However if 114A is prior to timestamp 114B, that may be an indication that master doc 104 was changed or updated since user device 108A last synchronized with master doe 104 or otherwise received local copy 110A. This may create a circumstance in which changes 112 may affect data or values that no longer exist or that may have changed, thus indicating a doc change conflict 117.

In step 250, a super user is notified of the conflict. For example, synchronization system 102 may send an e-mail, text, voice or other message to a super user 122 to resolve the doc change conflict 117. Super user 122 could be any user (or group of users) who is authorized to resolve the conflict 117, including the users who have accessed or updated data of master doc 104. In an embodiment, if several users are identified as super users 122, a resolution 120 may need to be received or agreed upon by more than one user or a majority of users before it is applied.

In step 260, a resolution of the conflict is received. For example, synchronization system 102 may generate a conflict interface 124 that allows super user 122 to view and address the data conflict 117. In an embodiment, super user 122 may directly modify data of enterprise system 106 via conflict interface 124. Synchronization system 102 may track and store the modifications provided by super user 122 as resolution 120. In an embodiment, a resolution may be received without providing notification to or receiving a resolution from a super user.

In step 270, the resolution is applied to resolve the conflict. For example, the changes or input provided by super user 122 may be saved as resolution 120, and master doc 104, local copy 110A, and corresponding timestamps 114B and 114A may be updated accordingly. Synchronization system 102 may then continue to process the next change request 115 from upload queue 116.

Figure 3:
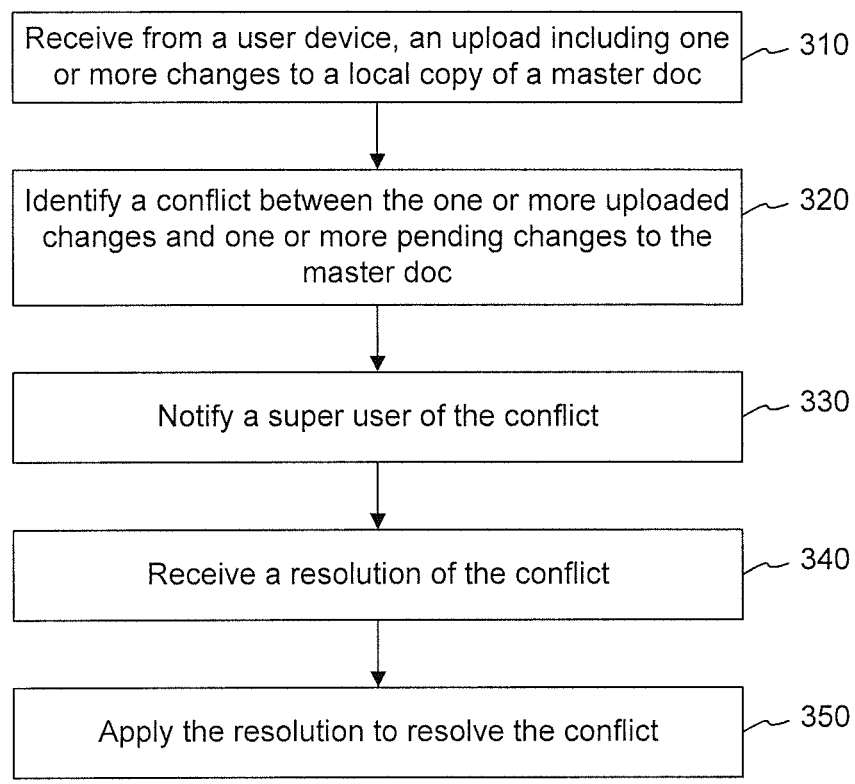
FIG. 3 is a flowchart for a method for the detection and resolution of conflicts in data synchronization, according to another embodiment.

FIG. 3 is a flowchart for a method 300 for the detection and resolution of conflicts in data synchronization, according to another embodiment. Method 300 can be performed by processing logic that can comprise hardware (e.g., circuitry, dedicated logic, programmable logic, microcode, etc.), software (e.g., instructions executing on a processing device), or a combination thereof.

In step 310, an upload is received from a user device, the upload including one or more changes to a local copy of a master document. For example, synchronization system 102 may receive changes 112 from one or more user devices 108. The changes 112 may be stored in upload queue 116 as change requests 115. Each change request 115 may be associated with a priority assigned based on time of receipt, time of change, user priority, or any other factor.

In step 320, a conflict is identified between the one or more uploaded changes and one or more pending changes to the master doc. For example, change request 115 may include changes 112 to be made to master doc 104. However, there may be one or more previously uploaded changes that are pending on master doc 104 already (e.g., pending changes 118). If pending changes 118 are affecting the same master doc 104, and/or portion/data of master doc 104 as change request 115, synchronization system 102 may detect a pending change conflict 119 that needs to be resolved before changes 112 can be implemented. As described above, with any detected conflict 117, 119, synchronization system 102 may perform a second level of processing to determine if the same data of master doc 104 is being affected by changes 112 and the conflicting action/data.

In step 330, a super user is notified of the conflict. For example, the super user 112 may include a user who is supposed to authorize/deny the pending change 118. Then, for example, if the pending change 118 is authorized and implemented, then changes 112 may be implemented as well (assuming there the implementation of the pending change doesn't create a new doc change conflict 117).

In step 340, a resolution of the conflict is received. For example, resolution 120 may be received via conflict interface 124 that may allow one or more super users 122 to modify the data or otherwise indicate what actions should be performed or which data should be implemented. In an embodiment, super user 122 may authorize changes 112 to be implemented while pending change 118 is still pending. In an embodiment, a resolution may be received without providing notification to or receiving a resolution from a super user.

In step 350, the resolution is applied to resolve the conflict. For example, resolution 120 may be received and data of master doc 104 may be updated. In addition one or more users or user devices 108 may be notified of the conflict 119, the resolution 120, and/or the super user 122.

Figure 4:
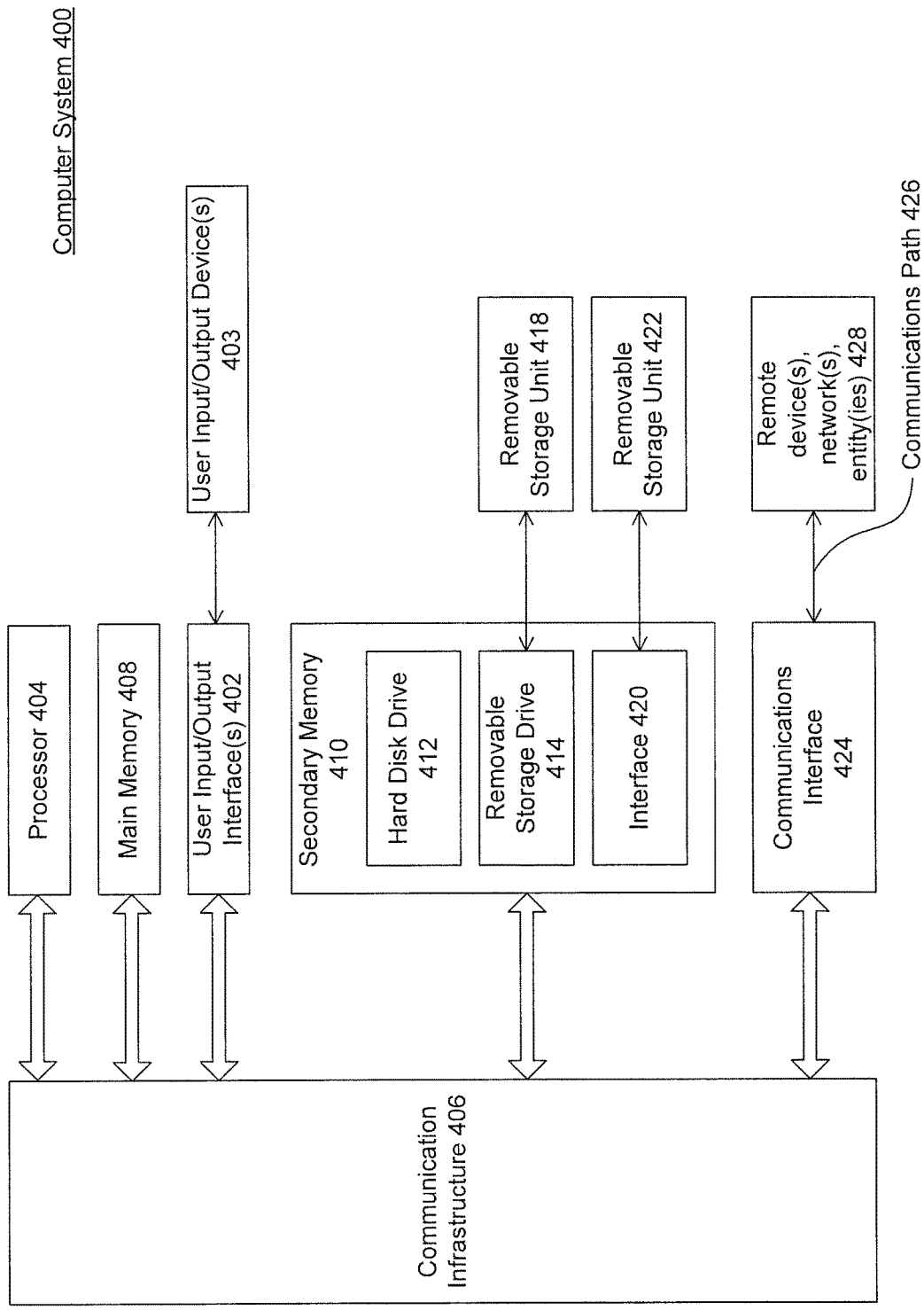
FIG. 4 is an example computer system useful for implementing various embodiments.

Various embodiments can be implemented, for example, using one or more well-known computer systems, such as computer system 400 shown in FIG. 4. Computer system 400 can be any well-known computer capable of performing the functions described herein.

Computer system 400 includes one or more processors (also called central processing units, or CPUs), such as a processor 404. Processor 404 is connected to a communication infrastructure or bus 406.

One or more processors 404 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main or primary memory 408, such as random access memory (RAM). Main memory 408 may include one or more levels of cache. Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In an embodiment, a tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 4. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method for accessing a cache, comprising:

receiving, by at least one processor, uploaded data from a user device, the uploaded data including one or more changes to a local copy of a master document that are stored in a change queue based on a priority associated with at least one of the user identifier associated with the device from which the uploaded data is received or data associated with the one or more changes, wherein the master document is shared among two or more users, and wherein the user device includes the local copy;

identifying, by the at least one processor, a conflict between the one or more changes to the local copy and the master document based on a last modification timestamp of the master document being subsequent to a previous synchronization timestamp of the local copy;

performing, by the at least one processor, a comparison between data corresponding to the changes to the local copy and data that was modified on the master document during one or more previous updates since the previous synchronization timestamp, wherein the at least one processor is configured to apply an automatic resolution to the conflict based on the changes to the local copy affecting different data than was previously modified on the master document since the previous synchronization timestamp;

determining, by the at least one processor and based on the comparison, that the automatic resolution cannot be applied to resolve the conflict;

generating a conflict interface notifying a super user of the conflict, wherein the conflict interface includes a view of data affected by the conflict, including when the one or more changes were made and by whom;

determining, by the at least one processor, a resolution of the conflict based on input received via the conflict interface; and applying; by the at least one processor, the resolution to the conflict, wherein the local copy and the master document include identical information as a result of the applying;

wherein at least one of the receiving, identifying, determining, and applying are performed by one or more computers.

2. The method of claim 1, wherein the determining based on the comparison comprises:

determining that one or more of the changes are directed to modifying data of the master document that was previously modified by one of the two or more users as a result of a modification to the master document performed subsequent to the previous synchronization timestamp of the local copy.

3. The method of claim 1, wherein the applying comprises:

updating one or more of the previous synchronization timestamp and last modification timestamp, wherein upon completion of the updating, the previous synchronization timestamp corresponds to the last modification timestamp.

4. The method of claim 1, wherein receiving the upload comprises:

receiving a document identifier identifying the master document; and receiving a document locator indicating a location of the master document on an enterprise system different from the user device.

5. The method of claim 1, wherein the previous synchronization timestamp indicates when the local copy was previously synchronized with the master document, and wherein the last modification timestamp indicates when the master document was previously modified by one of the two or more users.

6. The method of claim 1, wherein the data that was modified on the master document includes at least two different groups of records that are grouped based on when the respective records were updated, and wherein each group includes its own respective and unique timestamp prior to the previous synchronization timestamp.

7. The method of claim 1, further comprising:

providing a link to the super user, wherein a selection of the link provides access to the conflict interface.

8. The method of claim 1, wherein the conflict interface includes an indication that requires a confirmation of approval from a majority of the multiple persons indicated.

9. The method of claim 1, wherein the change queue includes uploaded data associated with different master documents of different document types.

10. A non-transitory computer-readable device having instructions stored thereon that, when executed by at least one computing device, cause the at least one computing device to perform operations comprising:

receiving, by at least one processor, uploaded data from a user device, the uploaded data including one or more changes to a local copy of a master document that are stored in a change queue based on a priority associated with at least one of the user identifier associated with the device from which the uploaded data is received or data associated with the one or more changes, wherein the master document is shared among two or more users, and wherein the user device includes the local copy;

identifying, by the at least one processor, a conflict between the one or more changes to the local copy and the master document based on a last modification timestamp of the master document being subsequent to a previous synchronization timestamp of the local copy;

performing, by the at least one processor, a comparison between data corresponding to the changes to the local copy and data that was modified on the master document during one or more previous updates since the previous synchronization timestamp, wherein the at least one processor is configured to apply an automatic resolution to the conflict based on the changes to the local copy affecting different data than was previously modified on the master document since the previous synchronization timestamp;

determining, by the at least one processor and based on the comparison, that the automatic resolution cannot be applied to resolve the conflict;

generating a conflict interface notifying a super user of the conflict, wherein the conflict interface includes a view of data affected by the conflict, including when the one or more changes were made and by whom;

determining, by the at least one processor, a resolution of the conflict based on input received via the conflict interface; and applying, by the at least one processor, the resolution to the conflict, wherein one or more of the uploaded changes and pending changes are modified upon a completion of the applying;

wherein at least one of the receiving, identifying, determining, and applying are performed by one or more computers.

11. The device of claim 10, wherein applying comprises:

deleting one or more of the uploaded changes or the pending changes.

12. The device of claim 10, wherein the one or more uploaded changes are associated with a user, and wherein the one or more pending changes are associated with the same user.

13. The device of claim 10, wherein the one or more uploaded changes are associated with a first user, and wherein the one or more pending changes are associated with the second user different from the first user.

14. The device of claim 10, wherein receiving the upload comprises:

receiving a document identifier identifying the master document on a server; and receiving a document locator indicating a location of the master document on the server.

15. A system comprising:

a memory; and at least one processor coupled to the memory and configured to:
  receive uploaded data from a user device, the uploaded data including one or more changes to a local copy of a master document that are stored in a change queue based on a priority associated with at least one of the user identifier associated with the device from which the uploaded data is received or data associated with the one or more changes, wherein the master document is shared among two or more users, and wherein the user device includes the local copy;
  identify a conflict between the one or more uploaded changes and one or more previous changes to the master document;
  perform a comparison between data corresponding to the changes to the local copy and data that was modified on the master document during one or more previous updates since the previous synchronization timestamp, wherein the at least one processor is configured to apply an automatic resolution to the conflict based on the changes to the local copy affecting different data than was previously modified on the master document since the previous synchronization timestamp;
  determine, based on the comparison, that the automatic resolution cannot be applied to resolve the conflict;
  generate a conflict interface notifying a super user of the conflict, wherein the conflict interface includes a view of data affected by the conflict, including when the one or more changes were made and by whom;
  receive, via the conflict interface, a resolution of the conflict, wherein the conflict interface includes the one or more uploaded changes and the one or more pending changes to the master document; and
  apply the resolution to the conflict.

16. The system of claim 15, wherein the previous changes include one or more pending changes to the master document that have not yet been applied to the master doc.

17. The system of claim 15, wherein the processor configured to identify is configured to:
  determine a timestamp of the local copy; and
  identify that the conflict is between the one or more uploaded changes and one or more changes applied to the master document after the timestamp.

18. The system of claim 17, wherein the conflict is between changes to the master document received from a single user.

* * * * *